United States Patent [19]

Yasumoto

[11] Patent Number: 5,562,843
[45] Date of Patent: Oct. 8, 1996

[54] INDUSTRIAL ROBOT WITH CONTACT SENSOR

[75] Inventor: Kenji Yasumoto, Toyonaka, Japan

[73] Assignee: Joven Electric Co., Ltd., Osaka, Japan

[21] Appl. No.: 308,650

[22] Filed: Sep. 19, 1994

Related U.S. Application Data

[63] Continuation-in-part of Ser. No. 994,491, Dec. 21, 1992, abandoned.

[30] Foreign Application Priority Data

Dec. 28, 1991 [JP] Japan ..................... 3-359777

[51] Int. Cl.$^6$ ..................... B23K 9/12
[52] U.S. Cl. ............... 219/124.34; 318/568.16; 901/10; 901/42; 901/46
[58] Field of Search ............... 219/124.34; 318/568.16, 318/575, 638; 901/10, 33, 35, 42, 46; 73/866.5; 324/756

[56] References Cited

U.S. PATENT DOCUMENTS 3,594,540  7/1971  Weinfurt ..................... 219/124.34
4,389,561  6/1983  Weman et al. ..................... 219/124.34
4,514,616  4/1985  Warner ..................... 901/42
4,540,869  9/1985  Yasuoka ..................... 219/124.34
4,975,557  12/1990  Yamada et al. ..................... 219/69.12

FOREIGN PATENT DOCUMENTS

240685  11/1986  Germany ..................... 219/124.34
265100  2/1989  Germany ..................... 219/124.34
60-18276  1/1985  Japan ..................... 219/124.34

*Primary Examiner*—Clifford C. Shaw
*Attorney, Agent, or Firm*—Thomas R. Morrison; Christopher R. Pastel

[57] ABSTRACT

A contact sensor for a robot includes a plurality of electrically conductive shafts extending outward from a moving portion of the robot. Electrically conductive flexible feelers are disposed on the shafts. In one embodiment the feelers are disposed in fan-like arrangement similar to a peacock feather. Leakage current from a low voltage power source is used by a robot controller to sense contact with a conductive object. The robot controller immediately stops operation and movement of the robot before damage occurs.

14 Claims, 8 Drawing Sheets

INDUSTRIAL ROBOT WITH CONTACT SENSOR

This is a continuation-in-part of U.S. patent aplication Ser. No. 07/994,491 filed Dec. 21, 1992, and entitled INDUSTRIAL ROBOT, now abandoned.

BACKGROUND

This invention relates to an industrial robot having contact sensing to avoid accidents and collisions of a robot arm with an operator, another robot, or any other object and avoid injury or damage to operators, other equipment, or the robotic arm itself.

Various approaches to solving this problem have been tried in the prior art. U.S. Pat. No. 4,514,616 discloses a robot arm collision detection mechanism having two movable members which are engaged in a cam surface-cam follower arrangement. A collision causes one member to become displaced from its "home position" and this displacement triggers a control switch.

U.S. Pat. No. 4,540,869 discloses a shaft inside a collision detection mechanism. When the welding torch nozzle moves sideways and strikes an object tip, the shaft is displaced. This lateral displacement of the shaft from its usual position triggers a control switch.

These solutions are mechanically complex and add measurably to the weight of the robot arm.

OBJECTS AND SUMMARY OF THE INVENTION

Accordingly, it is an object of the present invention to prevent the collision of a welding robot with another welding robot working at an adjacent position thereto or against an operator.

It is a further object of this invention to overcome the limitations of the prior art and provide a sensor that is reliable, light-weight, and relatively simple to manufacture and maintain.

Briefly stated, a contact sensor for a robot includes a plurality of electrically conductive shafts extending outward from a moving portion of the robot. Electrically conductive flexible feelers are disposed on the shafts. In one embodiment the feelers are disposed in fan-like arrangement similar to a peacock feather. Leakage current from a low voltage power source is used by a robot controller to sense contact with a conductive object. The robot controller immediately stops operation and movement of the robot before damage occurs.

According to an embodiment of the invention, an industrial robot having a moveable arm includes a contact sensor affixed to the arm, means for biasing the contact sensor with a voltage, means for detecting a leakage current generated when the contact sensor makes contact with an object, and means for reacting to the leakage current by stopping the arm. The contact sensor includes an electrically conductive base, at least: one electrically conductive shaft affixed to the base, and at least one electrically conductive feeler affixed to the shaft.

According to an embodiment of the invention, a contact sensor for a machine tool having a moveable element includes an insulating ring on the element, an electrically conductive base on the ring, a plurality of electrically conductive shafts affixed to the base, a plurality of electrically conductive feelers affixed to the shafts, means for applying a voltage to the shafts, and means for sensing a leakage current resulting from contact with an object.

According to a feature of the invention, at least one of the shafts further includes a steel wire, an electrically conductive layer substantially enclosing the steel wire, and an electrically conductive cap affixed to the end of the shaft.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT(S)

Figure 1:
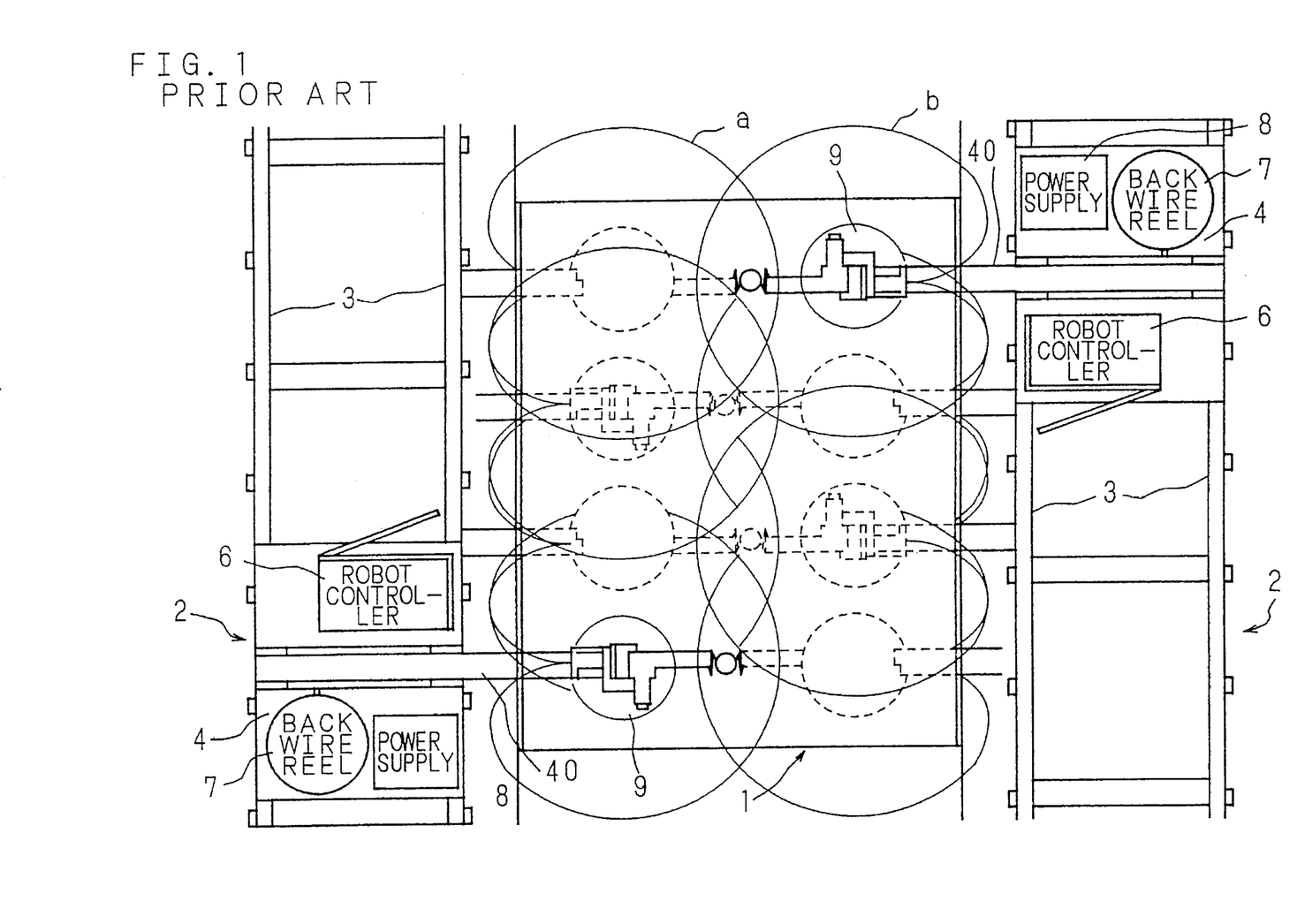
FIG. 1 is an elevation view of a conventional welding robot system according to the prior art.
Figure 2:
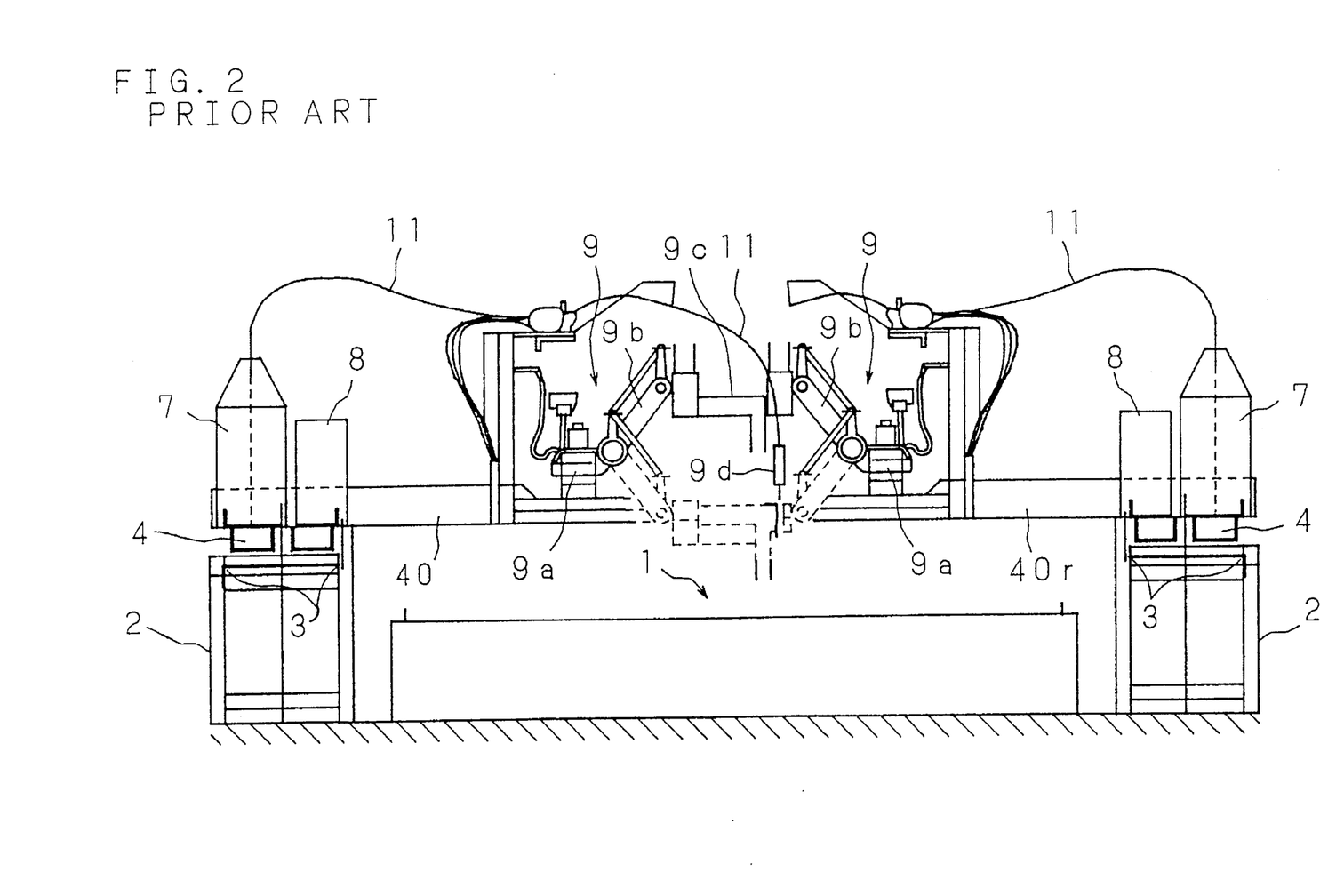
FIG. 2 is a section plan view of the conventional welding robot system according to the prior art of FIG. 1.

Referring to FIGS. 1 and 2, a plurality of prior art welding robots share the work of automatically welding a plurality of welding points. Arcs a, b describe respective arcs of the welding arms of two welding robots.

Long frames 2 of a predetermined height are at the right and left sides of a work stage 1 onto which an object to be welded is mounted. The frames 2 are parallel to each other. Tracks 3, each consisting of two rails, run on the corresponding frames 2 in a longitudinal direction of the frame. Robot carts 4 are slidably installed on tracks 3. Robot supporting arms 40 extend approximately from the central part of carts 4 in one direction of the work orthogonal to the running direction of carts 4. A robot controller 6, a back wire reel 7 around which a welding wire is wound, and a welding power supply 8 are mounted to each robot cart 4.

Welding robots 9 are placed at an end of each robot supporting arm 40. Supporting arm 40 is composed of a main body 9a, a main arm 9b, and an L-shaped assisting arm 9c. Supporting arm 40 has a full range of motion because main arm 9b is hingeably coupled to main body 9a and L-shaped assisting arm 9c is hingeably coupled to main arm 9b. Torch 9d is rotatably mounted around the axial center of assisting arm 9c at an end of assisting arm 9c. A welding wire 11 is fed to torch 9d from the back wire reel 7.

Controller 6 mounted to each robot cart 4 drives main body 9a in accordance with the respective control program, thereby bending, extending, or rotating main arm 9b and assisting arm 9c. Robot controller 6 also controls the stopping position of the robot cart 4.

When two welding robots 9 perform welding according to different control programs while they are very close to each other, arms 9b and 9c may collide against main body 9a to warp or break arms 9b and 9c. For example, when welding robot 9 changes the direction of torch 9d after completing a series of welding operations and main body 9a is rotated to change the position of main arm 9b and assisting arm 9c, the chance of a collision is high. There is also a possibility that arms 9b and 9c could hit and hurt an operator.

In order to overcome this problem, it is desirable to attach a sensor to the robot arm to detect a collision and stop the robot before damage occurs. An ideal sensor should detect a collision in as many planes as possible, require less force to activate than would damage the robot, return accurately to its pre-collision position after the colliding objects are separated, withstand the ambient conditions found in the workplace such as temperature, smoke, etc., withstand the force of the collision itself, and weigh as little as possible.

Figure 3:
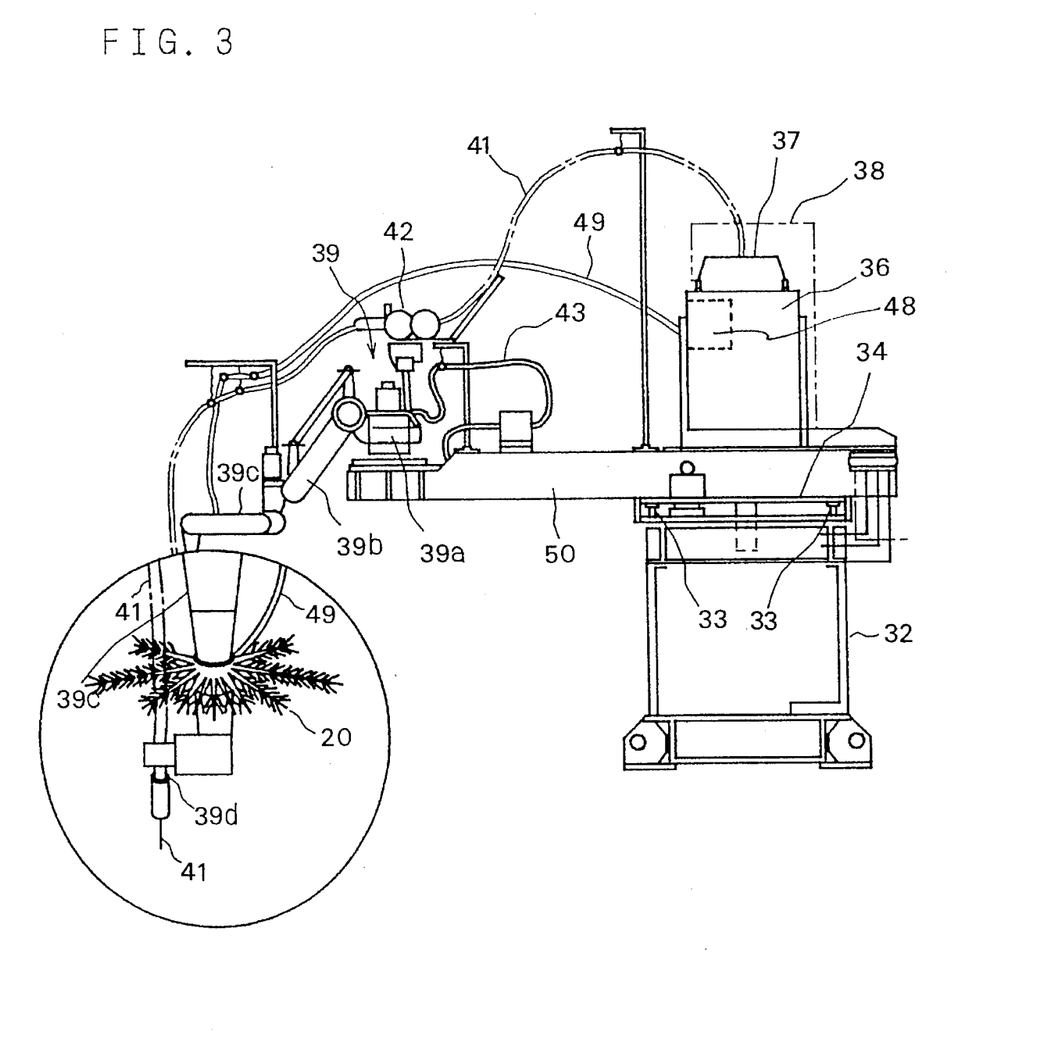
FIG. 3 is a partially exploded side sectional view of a welding robot system employing a contact sensor according to an embodiment of the present invention.

Referring to FIG. 3, the present invention includes a contact sensor 20 for a welding robot 39. A track 33 extends at a predetermined height in a longitudinal direction (into and out of the page) of a long frame 32. A robot cart 34 is slidably mounted on track 33. Robot cart 34 includes a robot supporting arm 50 extending in a direction perpendicular to the running direction of robot cart 34.

Welding robot 39 is installed at an end of robot supporting arm 50. A robot controller 36, a back wire reel 37 with a spool of welding wire 41 thereupon, and a welding power supply 38 are mounted on robot cart 34 to move with welding robot 39.

Welding robot 39 includes a main body 39a which is rotatable within the same plane as robot supporting arm 50. For full three-dimensional motion, a main arm 39b is hingeably coupled to main body 39a. An L-shaped assisting arm 39c is hingeably coupled to main arm 39b. A torch 39d is pivotable around the axial center of assisting arm 39c. Welding wire 41, unspooled from back wire reel 37, is supplied to torch 39d by a wire feed unit 42.

Robot controller 36 on robot cart 34 controls main body 39a of the robot in accordance with the control program to bend, extend, or rotate main arm 39b and assisting arm 39c, and controls the stopping position of robot cart 34. A detecting cable 49 connects contact sensor 20 to a low voltage power source 48. Welding wire 41 is connected to a cable 43 from robot main body 39a. A hidden portion of cable 43 passes through torch 39d, assisting arm 39c, and main arm 39b. Cable 43 is connected to power supply 38. Accordingly, power from welding power supply 38 is fed to welding wire 41 via cable 43.

Robot controller 36 moves and stops robot cart 34 at a predetermined position according to a program stored therein, so that main arm 39b, assisting arm 39c and torch 39d of welding robot 39 are directed to a predetermined position. Welding wire 41 exposed from torch 39d touches the welding position of an object to be welded. Power is supplied from welding power supply 38 to welding wire 41 passing through torch 39d to start the welding operation.

At the start of welding, the direction of each of main arm 39b, assisting arm 39c, and torch 39d is controlled by controller 36 to move an end of torch 39d along the weld to perform welding. Other welding robots 39 may be welding at the same time according to their own control programs. During welding operations, when one welding robot 39 comes close to another welding robot 39, and contact sensor 20 makes contact with another object such as, for example, another welding robot or an operator, a leakage current flows from low voltage power source 48 through contact sensor 20. Robot controller 36 senses the current via cable 49 and stops both the welding operation and movement of welding robot 39. Therefore, both the welding operation and the movement of all robots are stopped quickly just before assisting arm 39c of welding robot 39 collides with an obstruction such as another welding robot or the operator.

Figure 4:
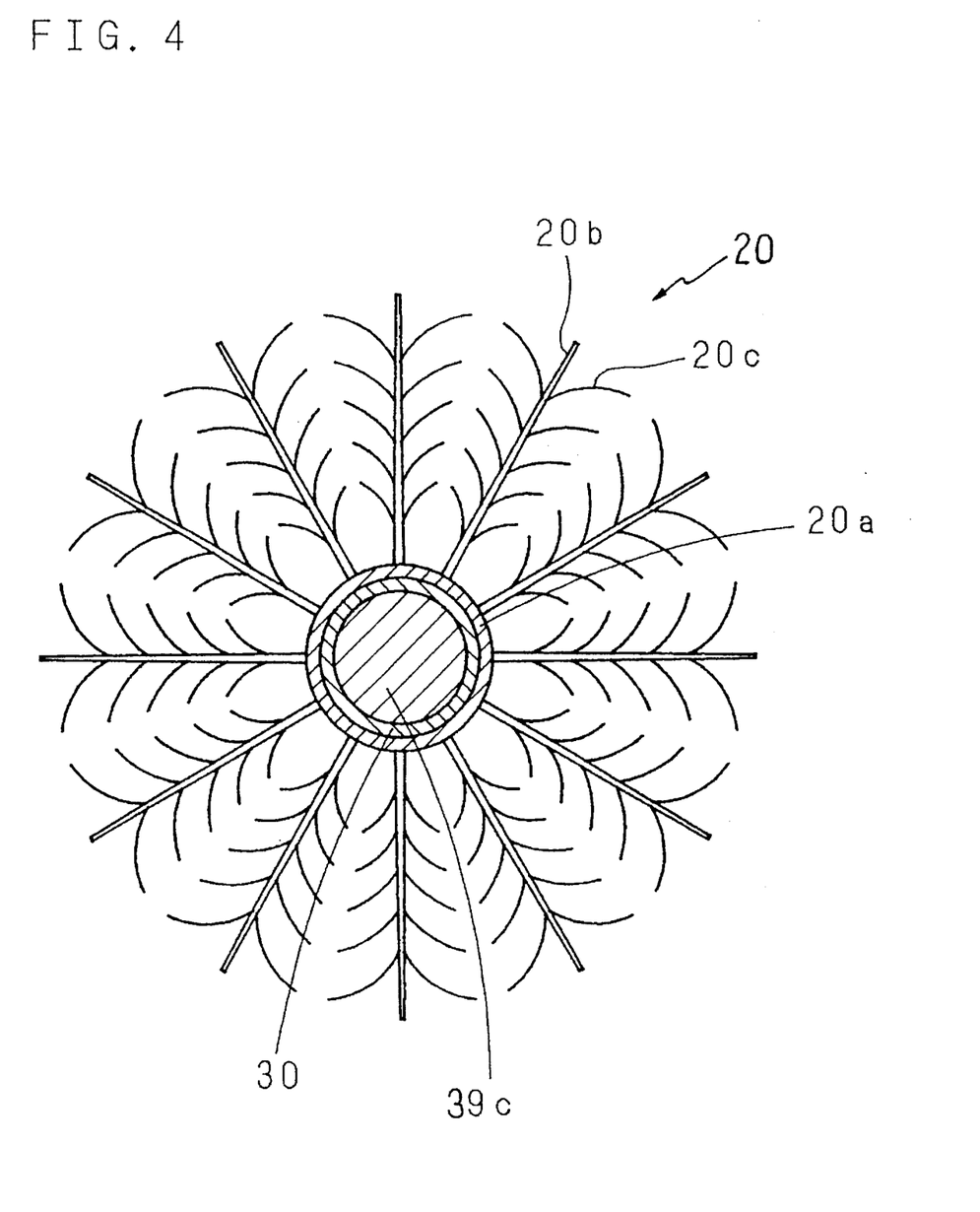
FIG. 4 is an enlarged view of the contact sensor shown in FIG. 3.

Referring also to FIG. 4, contact sensor 20 is disposed around the outer surface of assisting arm 39c near torch 39d. A plurality of shafts 20b extend radially from a base 20a about an axis of contact sensor 20. Each shaft 20b includes a plurality of feelers 20c extending from both sides toward its neighboring shafts 20b. Contact sensor 20 is spread in a fan-like arrangement similar to tail feathers of a peacock. Base 20a, shafts 20b and feelers 20c preferably are made of a flexible electrically conductive material, such as electrically conductive rubber or metal. An insulating substance 30 is interposed between contact sensor 20 and assisting arm 39c to prevent direct electrical contact therebetween.

Base 20a of contact sensor 20 can be of electrically conductive rubber or other conductive material. For added strength, base 20a preferably is made of a thin metal plate covered with an electrically conductive material. For example, if welding robot 39 were used in a weightless environment where contact sensor 20 did not have to support its own weight, base 20a need not be reinforced with the thin metal plate. Base 20a is wound around assisting arm 39c over insulating substance 30. Shafts 20b are preferably made of wire or electrically conductive rubber. Feelers 20c are preferably of an electrically conductive rubber thin enough to bend easily from contact with another object branch off from each of the shafts 20b. When shafts 20b and feelers 20c are both of electrically conductive rubber, both can be integrally formed during a single molding operation. Feelers 20c must be short enough to avoid contact with neighboring feelers 20c. The size and form of contact sensor 20 may be modified by cutting shafts 20b or feelers 20c either before or after winding around assisting arm 39c.

Insulating layer 30 may be applied to assisting arm 39c. Alternatively, insulating layer 30 may be layered on the lower surface of base 20a of contact sensor 20. In this case, contact sensor 20 is directly wound around assisting arm 39c.

Returning now to FIG. 3, a detecting cable 49 connects contact sensor 20 to robot controller 36. When contact is made with an electrically conductive object, controller 36 detects a leakage current flowing through contact sensor 20. Controller 36 responds to the detected leakage current by stopping the welding operation and the movement of welding robot 39 before damage occurs. Since human bodies and other robots are electrically conductive, leakage current flows when contact is made with such objects. Thus, such objects are protected by the stoppage of welding robot 39.

Figure 5:
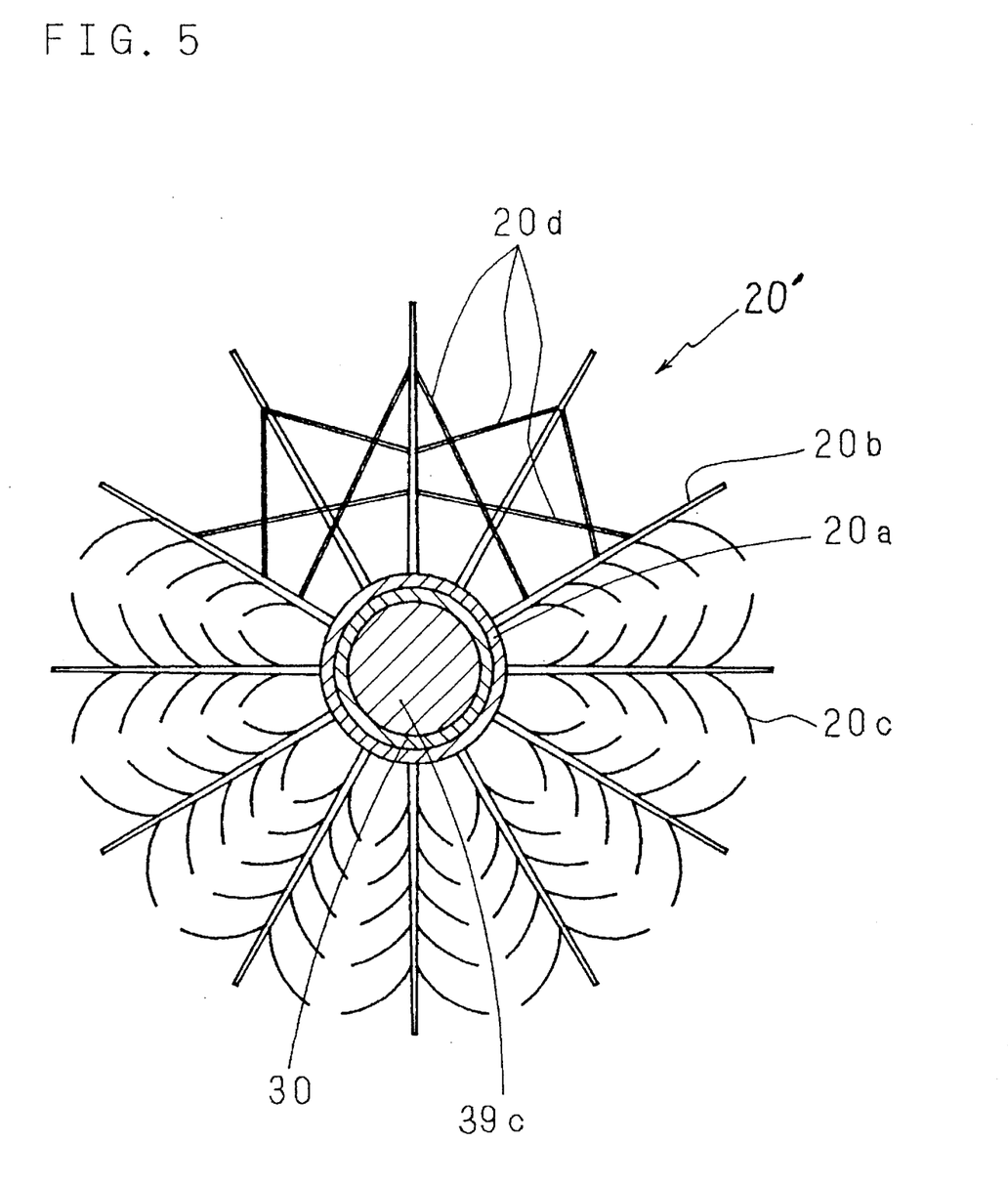
FIG. 5 is an enlarged fragmentary view of a modified contact sensor according to an alternative embodiment of the present invention.

Referring to FIG. 5, a further embodiment of a contact sensor 20' includes reinforcing member 20d to strengthen shafts 20b by linking them. Only a few of shafts 20b in one sector are shown linked by reinforcing members 20d. In some cases, reinforcing members 20d connect adjacent shafts 20b. In other cases, reinforcing members 20d connect non-adjacent shafts 20b. In some applications, the arrangement shown, in which a limited sector of contact sensor 20' is reinforced, may be satisfactory. In other applications, substantially all of shafts 20b may be linked and reinforced by reinforcing members 20d.

Figure 6:
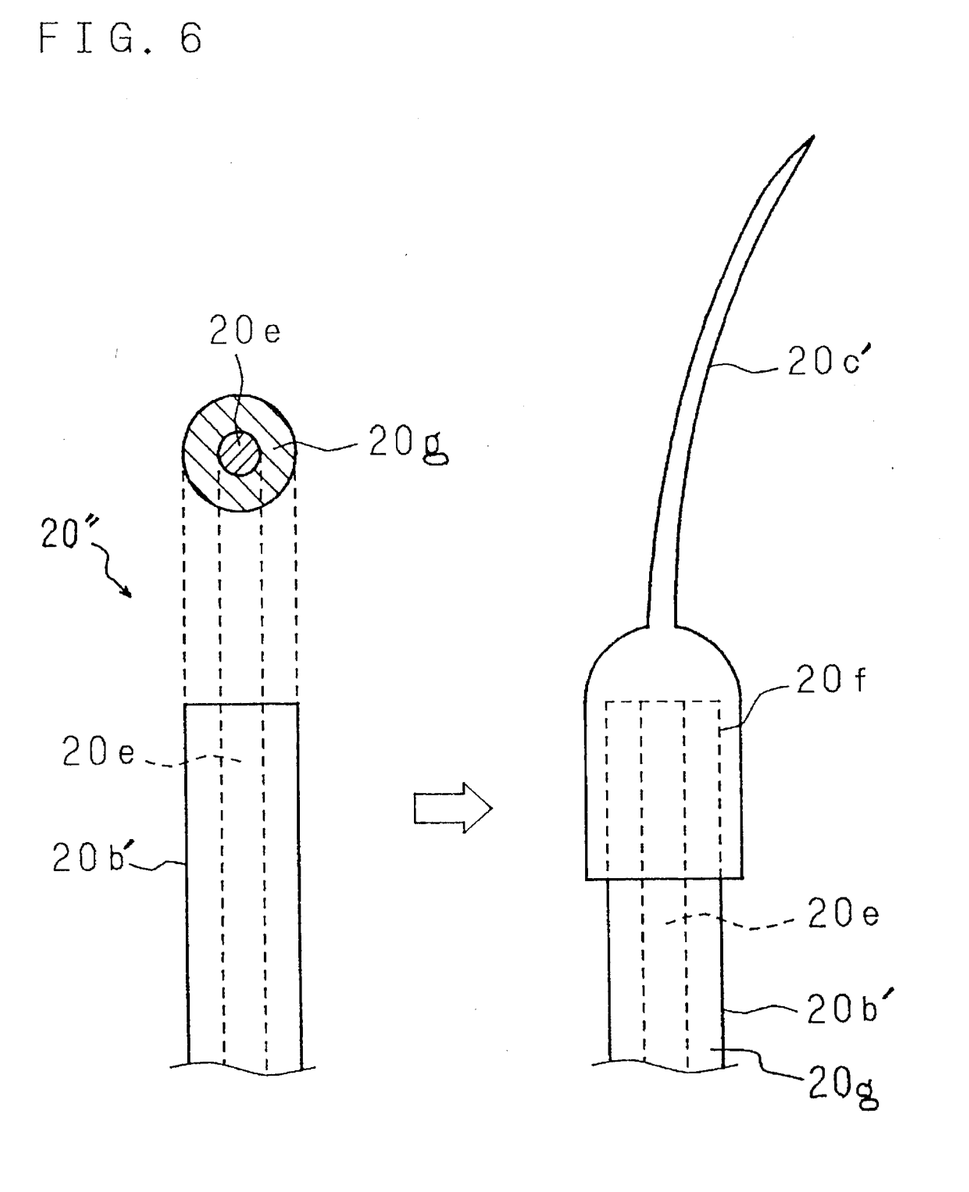
FIG. 6 is an enlarged view of a modified contact sensor according to an alternative embodiment of the present invention.

Referring now to FIG. 6 a modified contact sensor 20" includes a shaft 20b' in which a steel wire 20e is centered in a pipe-shaped layer 20g of electrically conductive rubber. A cap 20f having a feeler 20c' on its top fits over the end of shaft 20b'. Cap 20f is preferably of electrically conductive rubber. Feeler 20c' provides the desired resilience to permit sensing with no more than light contact with an object being sensed. Cap 20f prevents steel wire 20e in the center of shaft 20b' from injuring an object as could happen if the cut end of shaft 20b' were to make contact with the object. The size and form of contact sensor 20" may be adjusted by cutting shaft 20b' or feeler 20c' either before or after winding around assisting arm 39c. Cap 20f is installed after cutting shaft 20b'.

As would be evident to one skilled in the art, layer 20g and cap 20f may be integrally formed on shaft 20b' in a single molding operation.

Figure 7:
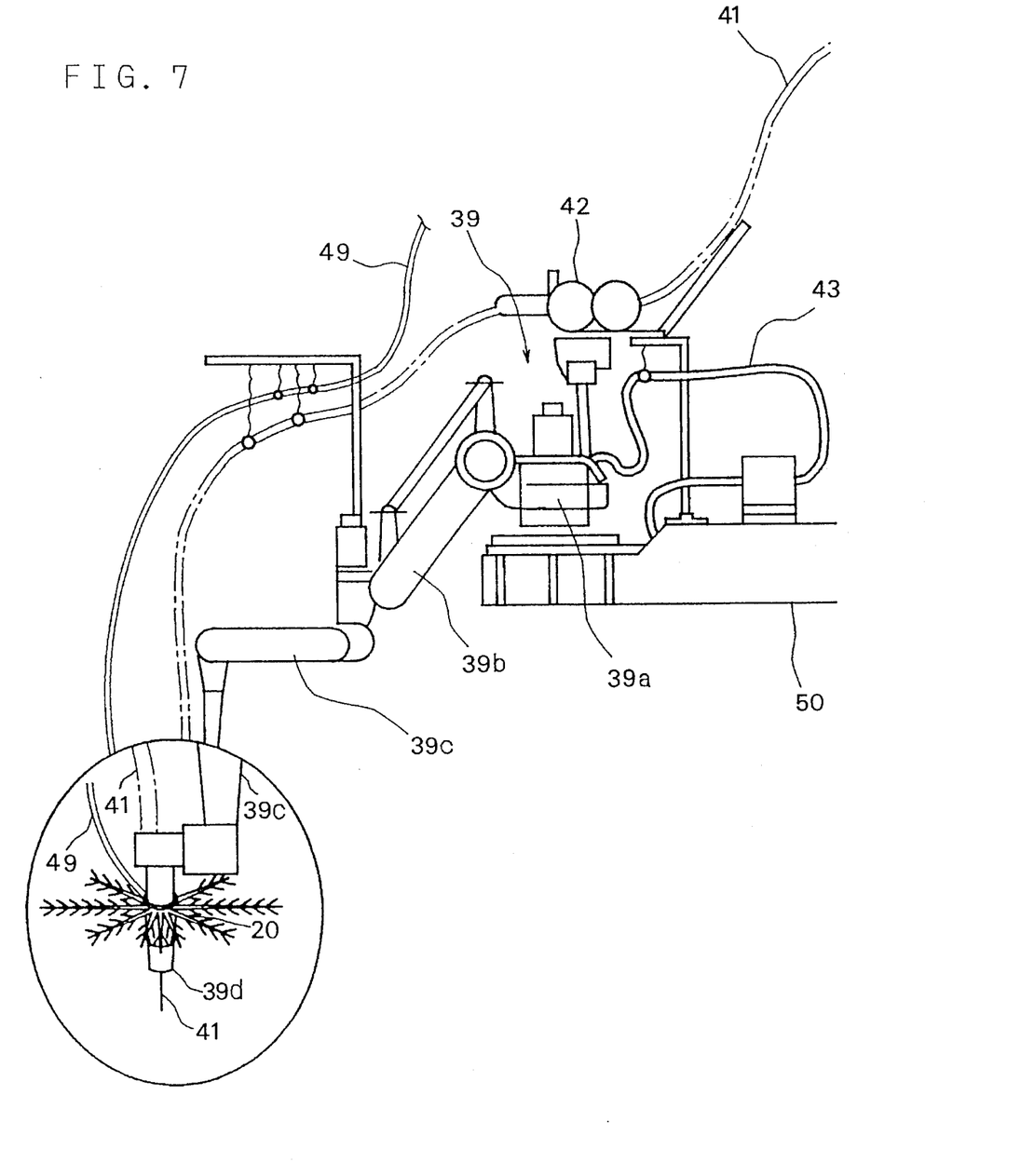
FIG. 7 is a partially exploded side view showing an alternative attachment of the contact sensor of the present invention to the welding robot.

Referring to FIG. 7, an alternative embodiment is shown in which contact sensor 20 is attached to torch 39d rather than to assisting arm 39c, as in the embodiment of FIG. 3.

Figure 8:
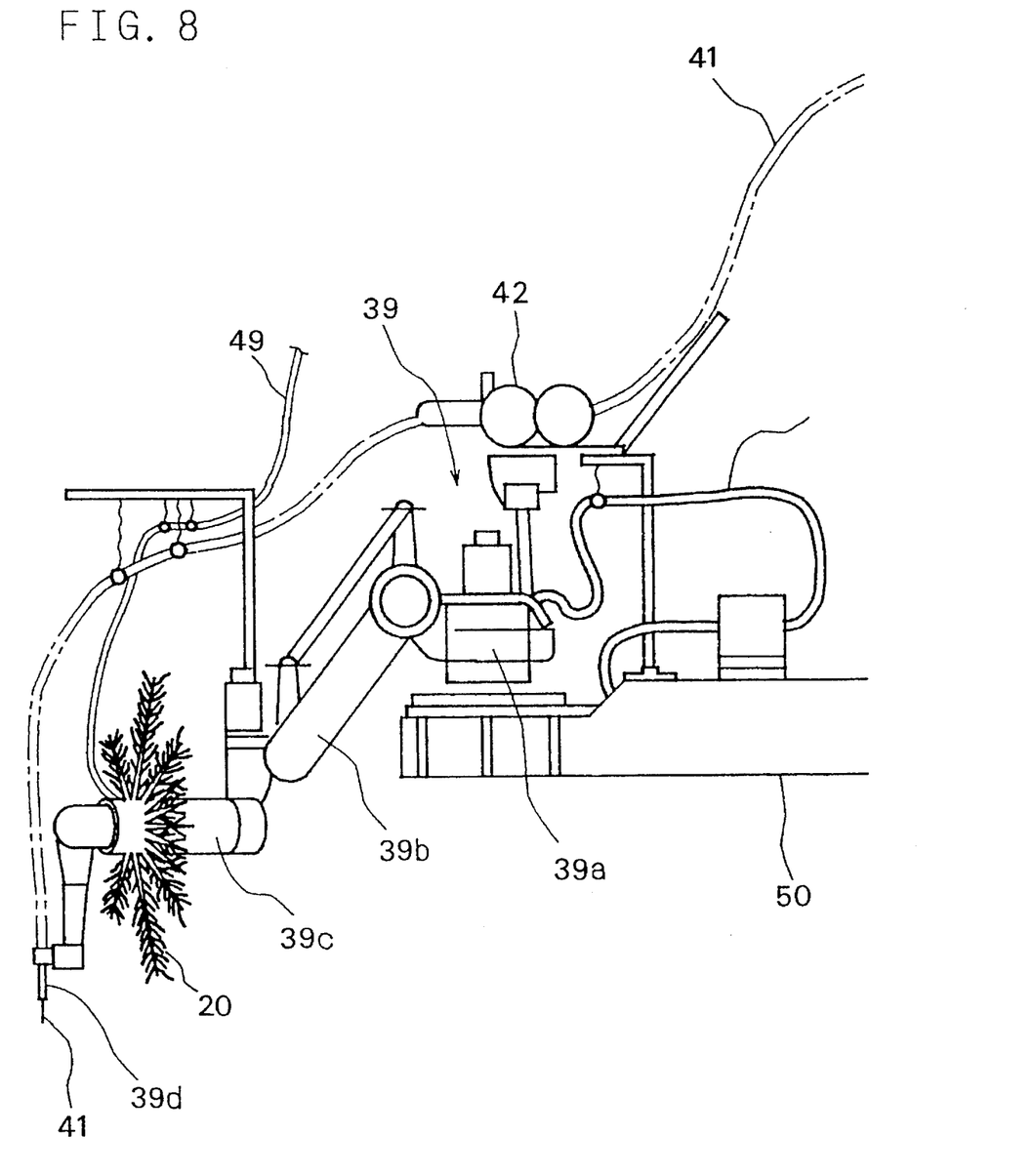
FIG. 8 is an elevation view showing an alternative attachment of the contact sensor of the present invention to the welding robot.

Referring to FIG. 8, an alternative embodiment is shown in which contact sensor 20 is attached to another portion of assisting arm 39c.

The present embodiment permits contact sensing using a simple program in controller 36. Moreover, contact sensor 20, made of any electrically conductive material, can be manufactured inexpensively and mounted with ease because of its flexibility.

Although the above description of this invention is directed to the welding robot, it should be obvious that this invention is equally applicable to a painting robot, an assembling robot, a moving robot, or any machine tool with a moveable element.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An industrial robot having a moveable arm, comprising:

a contact sensor affixed to said arm;

said contact sensor including an electrically conductive base around said arm, at least one flexible and electrically conductive shaft affixed to said base, and at least one flexible and electrically conductive feeler affixed to said shaft;

means for biasing said contact sensor with a voltage;

means for detecting a leakage current generated when said contact sensor makes contact with an object; and means for reacting to said leakage current by stopping said arm.

2. Apparatus according to claim 1, wherein said shaft is made of metal wire.

3. Apparatus according to claim 1, wherein said shaft is made of electrically conductive rubber.

4. Apparatus according to claim 1, further comprising at least one reinforcing member linking at least two of said shafts.

5. Apparatus according to claim 1, wherein said shaft includes a metal wire substantially enclosed by electrically conductive rubber.

6. Apparatus according to claim 5, wherein said shaft further comprises an electrically conductive rubber cap affixed to an end thereof.

7. A contact sensor comprising:

an electrically conductive base;

at least one flexible and electrically conductive shaft affixed to said base;

a plurality of flexible and electrically conductive feelers affixed to said at least one shaft;

means for applying a voltage to said at least one shaft; and means for sensing a leakage current resulting from contact with an object.

8. A device according to claim 7, wherein at least said flexible and electrically conductive feelers are electrically conductive rubber.

9. A contact sensor for a machine tool having a moveable element, comprising:

an insulating ring on said element;

an electrically conductive base on said insulating ring;

at least one flexible and electrically conductive shaft affixed to said base;

a plurality of flexible and electrically conductive feelers affixed to said at least one shaft;

means for applying a voltage to said at least one shaft; and means for sensing a leakage current resulting from contact with an object.

10. A device according to claim 9, wherein at least one of said shafts further comprises:

a steel wire;

an electrically conductive layer substantially enclosing said steel wire; and an electrically conductive cap affixed to an end of said shaft.

11. A device according to claim 10, wherein said layer and said cap are of electrically conductive rubber.

12. A device according to claim 10, wherein said layer and said cap are integrally formed.

13. A device according to claim 9, wherein at least one of said shafts is linked to an adjacent one of said shafts.

14. A device according to claim 9, wherein at least one of said shafts is linked to a non-adjacent one of said shafts.

* * * * *